(12) United States Patent
Joynes et al.

(10) Patent No.: US 9,005,026 B2
(45) Date of Patent: *Apr. 14, 2015

(54) GAME CONTROLLER FOR TABLET COMPUTER

(75) Inventors: Matthew Joynes, Agoura Hills, CA (US); James Bower, Windermere, FL (US)

(73) Assignee: Wikipad, Inc., Westlake Village, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/494,801

(22) Filed: Jun. 12, 2012

(65) Prior Publication Data
US 2013/0157763 A1 Jun. 20, 2013

Related U.S. Application Data

(60) Provisional application No. 61/577,709, filed on Dec. 20, 2011.

(51) Int. Cl.
| | |
|---|---|
| *A63F 9/24* | (2006.01) |
| *G06F 1/16* | (2006.01) |
| *G06F 3/02* | (2006.01) |
| *A63F 13/20* | (2014.01) |
| *A63F 13/90* | (2014.01) |

(52) U.S. Cl.
CPC .................. *A63F 13/06* (2013.01); *A63F 13/08* (2013.01); *A63F 2300/1043* (2013.01); *A63F 2300/204* (2013.01)

(58) Field of Classification Search
USPC .................. 361/679.11; 455/66.1; 463/36–38
See application file for complete search history.

(56) References Cited

U.S. PATENT DOCUMENTS

| | | | |
|---|---|---|---|
| 5,629,733 A | 5/1997 | Youman et al. | |
| 5,740,389 A | 4/1998 | Li et al. | |

(Continued)

FOREIGN PATENT DOCUMENTS

WO    WO 03044625    5/2003

OTHER PUBLICATIONS

David Chartier, Preorders begin for iPhone, iPod touch game controller, Feb. 8, 2011, http://www.macworld.com/article/1157741/icontrolpad.html.*

(Continued)

*Primary Examiner* — Dmitry Suhol
*Assistant Examiner* — Jason Yen
(74) *Attorney, Agent, or Firm* — Hall Estill Attorneys at Law; Daniel P. Dooley

(57) ABSTRACT

An apparatus generally directed to controlling a video game. The apparatus preferably includes a tablet computer, an electronic game communicating with the tablet computer, and an input device for controlling movement of a virtual object provided by the electronic game. Preferably, the input device includes a pair of opposing side structures adjacent opposing sides of plurality of sides of the tablet computer. The input device further preferably includes a plurality of input switches, wherein said input switches are adjacent each of the at least two opposing sides of the plurality of sides of the tablet computer, and a bridge structure disposed between the pair of sides to form a three sided structure. The third structure mitigates inadvertent removal of the tablet computer from the three sided structure when the tablet computer is fully nested within the three sided structure.

18 Claims, 7 Drawing Sheets
(4 of 7 Drawing Sheet(s) Filed in Color)

(56) References Cited

U.S. PATENT DOCUMENTS

| | | | |
|---|---|---|---|
| 5,967,898 A | 10/1999 | Takasaka et al. | |
| 5,976,018 A | 11/1999 | Druckman | |
| 6,153,843 A * | 11/2000 | Date et al. | 200/339 |
| 6,290,565 B1 | 9/2001 | Galyean, III et al. | |
| 6,532,152 B1 | 3/2003 | White et al. | |
| 6,710,764 B1 | 3/2004 | Burgel et al. | |
| 7,200,702 B2 | 4/2007 | Keely et al. | |
| 7,298,613 B2 | 11/2007 | Yin et al. | |
| 7,653,771 B2 | 1/2010 | Liberty | |
| 7,733,637 B1 * | 6/2010 | Lam | 361/679.11 |
| 7,746,629 B2 | 6/2010 | Assouad et al. | |
| 7,758,424 B2 * | 7/2010 | Riggs et al. | 463/37 |
| 7,774,155 B2 | 8/2010 | Sato et al. | |
| 7,818,668 B2 | 10/2010 | Michelstein et al. | |
| 7,833,097 B1 | 11/2010 | Maddox et al. | |
| 7,852,322 B2 | 12/2010 | Park | |
| 7,933,118 B2 | 4/2011 | Chiu et al. | |
| 7,942,745 B2 * | 5/2011 | Ikeda et al. | 463/38 |
| 8,018,098 B2 | 9/2011 | Lu et al. | |
| 8,100,769 B2 | 1/2012 | Rabin | |
| 8,100,770 B2 | 1/2012 | Yamazaki et al. | |
| 8,180,295 B2 | 5/2012 | Mao | |
| 8,188,977 B2 | 5/2012 | Kuwaki et al. | |
| 8,192,285 B2 | 6/2012 | Cheng et al. | |
| 2002/0155890 A1 * | 10/2002 | Ha et al. | 463/36 |
| 2003/0147008 A1 | 8/2003 | Liu | |
| 2003/0231189 A1 | 12/2003 | Williams | |
| 2004/0224638 A1 * | 11/2004 | Fadell et al. | 455/66.1 |
| 2005/0272471 A1 | 12/2005 | Sherman | |
| 2006/0048076 A1 | 3/2006 | Vronay et al. | |
| 2006/0250367 A1 * | 11/2006 | Tabasso et al. | 345/168 |
| 2006/0291156 A1 | 12/2006 | Allen | |
| 2007/0159466 A1 * | 7/2007 | Kawell et al. | 345/169 |
| 2007/0268247 A1 | 11/2007 | Quatro | |
| 2009/0036189 A1 * | 2/2009 | Wang | 463/16 |
| 2009/0209288 A1 | 8/2009 | Rofougaran | |
| 2009/0291760 A1 * | 11/2009 | Hepburn et al. | 463/37 |
| 2010/0069160 A1 * | 3/2010 | Barrett et al. | 463/46 |
| 2010/0081505 A1 * | 4/2010 | Alten et al. | 463/36 |
| 2010/0103141 A1 | 4/2010 | Challener et al. | |
| 2010/0250815 A1 * | 9/2010 | Street et al. | 710/303 |
| 2011/0098111 A1 * | 4/2011 | Saito et al. | 463/31 |
| 2011/0118022 A1 | 5/2011 | Aronzon et al. | |
| 2011/0126156 A1 | 5/2011 | Krishnaraj et al. | |
| 2011/0242138 A1 | 10/2011 | Tribble | |
| 2011/0260969 A1 | 10/2011 | Workman | |
| 2012/0108335 A1 | 5/2012 | Liotta et al. | |
| 2012/0169597 A1 | 7/2012 | Liotta | |
| 2012/0236485 A1 * | 9/2012 | Staats et al. | 361/679.12 |

OTHER PUBLICATIONS

Chris Davies, ThinkGeek iCade arcade cabinet for iPad is fake with real promise, Apr. 1, 2010, http://www.slashgear.com/thinkgeek-icade-arcade-cabinet-for-ipad-is-fake-with-real-promise-0179984/.*

Dave Caolo, iControlPad, the physical controller for your iPhone, finally available for order, Feb. 8, 2011, http://www.tuaw.com/2011/02/08/icontrolpad-the-physical-controller-for-your-iphone-finally-av/.*

Chartier; "Preorders begin for iPhone, iPod touch game controller." Published Feb. 8, 2011; In Macworld website (online); http://www.macworld.com/article/1157741/icontrolpad.html; entire document especially p. 1.

Wattanajantra; "iControlPad unofficial iPhone gamepad coming soon." in c/net UK website (online); Published Aug. 27, 2010; http://crave.cnet.co.uk/mobiles/icontrolpad-unofficial-iphone-gamepad-coming-soon-50000514; entire document, especially pp. 3, 4.

Atari Arcade; Website Printout; http://atari.com/buy-games/arcade/atari-arcade-ipad; Nov. 30, 2011; pp. 1-3.

Ion iCade Arcade Cabinet; Website Printout; http://www.ionaudio.com/products/details/icade; 2012; pp. 1-6.

* cited by examiner

GAME CONTROLLER FOR TABLET COMPUTER

CLAIM OF PRIORITY

The current application claims priority to the U.S. Provisional Application Ser. No. 61/577,709 filed on Dec. 20, 2011.

SUMMARY

In a preferred embodiment an apparatus includes a tablet computer, the tablet computer preferably providing a plurality of sides, each of the plurality of sides are disposed between an electronic display screen and a back of the tablet computer, and an electronic game communicating with the tablet computer. The electronic game preferably provides an object displayed on the electronic display screen of the tablet computer, and movement of the object is controlled by an input device.

In a preferred embodiment, the input device includes at least a pair of side structures, one of the pair of side structures is adjacent to and confines the tablet computer on a first side of the plurality of sides of the tablet computer, the second side structure of the pair of side structures is adjacent to and confines the tablet computer on a second side of the plurality of sides of the tablet computer, wherein the first and second sides of the plurality of sides of the tablet computer are opposing sides of the plurality of sides of the tablet computer. The input device further preferably includes a plurality of input switches, wherein the input switches are adjacent each of the at least two opposing sides of the plurality of sides of the tablet computer, and a bridge structure disposed between the pair of side structures and adjacent a third side of the plurality of sides of the tablet computer. The bridge structure in combination with the pair side structures form a three sided structure in which the tablet computer nests such that the tablet computer is confined by the three sided structure, and the three sided structure mitigates inadvertent removal of the tablet computer from the three sided structure when the tablet computer is fully nested within the three sided structure.

BRIEF DESCRIPTION OF THE DRAWINGS

The patent or application file contains at least one drawing executed in color. Copies of this patent with color drawing(s) will be provided by the Patent and Trademark Office upon request and payment of necessary fee.

DETAILED DESCRIPTION

The present disclosure generally relates to an apparatus directed to controlling electronic games, also referred to herein as video games, or computer games. The apparatus preferably includes a tablet computer, an electronic game communicating with the tablet computer, and an input device for controlling movement of a virtual object provided by the electronic game. Preferably, the input device includes a pair of opposing side structures adjacent opposing sides of plurality of sides of the tablet computer. The input device further preferably includes a plurality of input switches, wherein said input switches are adjacent each of the at least two opposing sides of the plurality of sides of the tablet computer, and a bridge structure disposed between the pair of sides to form a three sided structure. The third structure mitigates inadvertent removal of the tablet computer from the three sided structure when the tablet computer is fully nested within the three sided structure.

Figure 1:
FIG. 1 is a front perspective view, with partial cutaway, of an embodiment an electronic game control apparatus constructed and operated in accordance with various embodiments disclosed and claimed herein.

Turning to the drawings, FIG. 1 provides an exemplary game controller 100 capable of being used in accordance with various embodiments of the present invention. The exemplary game controller 100 has at least a tablet computer 102 that providing a plurality of sides, such as 104, 106, 108, and 126. Each of the plurality of sides 104, 106, and 108 are disposed between an electronic display screen 110, of the tablet computer 102, and a back 112 (shown by FIG. 2) of the tablet computer 102 operates. The exemplary game controller 100 further preferably includes an input device 114.

In a preferred embodiment, the input device 114 provides a pair of side structures, 116 and 118. One of the pair of side structures, for example 116, is adjacent to and confines the tablet computer 102 on a first side, such as 104 of the plurality of sides 104, 106, 108, and 126 of the tablet computer 102. The second side structure of the pair of side structures, such as 118, is adjacent to and confines the tablet computer 102 on a second side, such as 108, of the plurality of sides 104, 106, 108, and 126 of the tablet computer 102, wherein the first and second sides, such as 104 and 108, of the plurality of sides 104, 106, 108, and 126 of the tablet computer 102 are opposing sides of the plurality of sides 104, 106, 108, and 126, of the tablet computer 102.

In a preferred embodiment, the input device 114 further provides a plurality of input switches 120 and 122, wherein the input switches 120 and 122 are adjacent each of the at least two opposing sides 104 and 108, of the plurality of sides 104, 106, 108, and 126, of the tablet computer 102, and a bridge structure 124, disposed between the pair of side structures 116 and 118, and adjacent the third side 126, of the plurality of sides 104, 106, 108, and 126, of the tablet computer 102. The bridge structure 124 in combination with the pair of side structures 116 and 118 form a three sided structure 128 (of FIG. 5) (also referred to herein as a u-shaped structure 128 of the input device 114), in which the tablet computer 102 nests, such that the tablet computer 102 is confined by the u-shaped structure 128, and the u-shaped structure 128 mitigates inadvertent removal of the tablet computer 102 from the u-shaped structure 128 when the tablet computer 102 is fully nested within the three sided structure 128.

The exemplary game controller 100 of FIG. 1, further preferably includes a video game 130. Preferably, the video game 130 provides a virtual object 132 displayed by the electronic display screen 110, the virtual object 132 is responsive to input from the input device 114. An example of a response of the virtual object 132 would be movement of the virtual object 132, or the loading of an alternate computer game, based on a predetermined signal provided by the input device 114, or an appearance of a character. It is noted that FIG. 1 displays the housings 119 of the plurality of switches 120, whereas at least some of the plurality of switches are shown in the partial cutaway of FIG. 3, and whereupon a manual intervention of a housing 119 of a selected switch of the plurality of switches 120, the selected switch produces a predetermined signal that is provided by the selected switch to the tablet computer 102.

Figure 2:
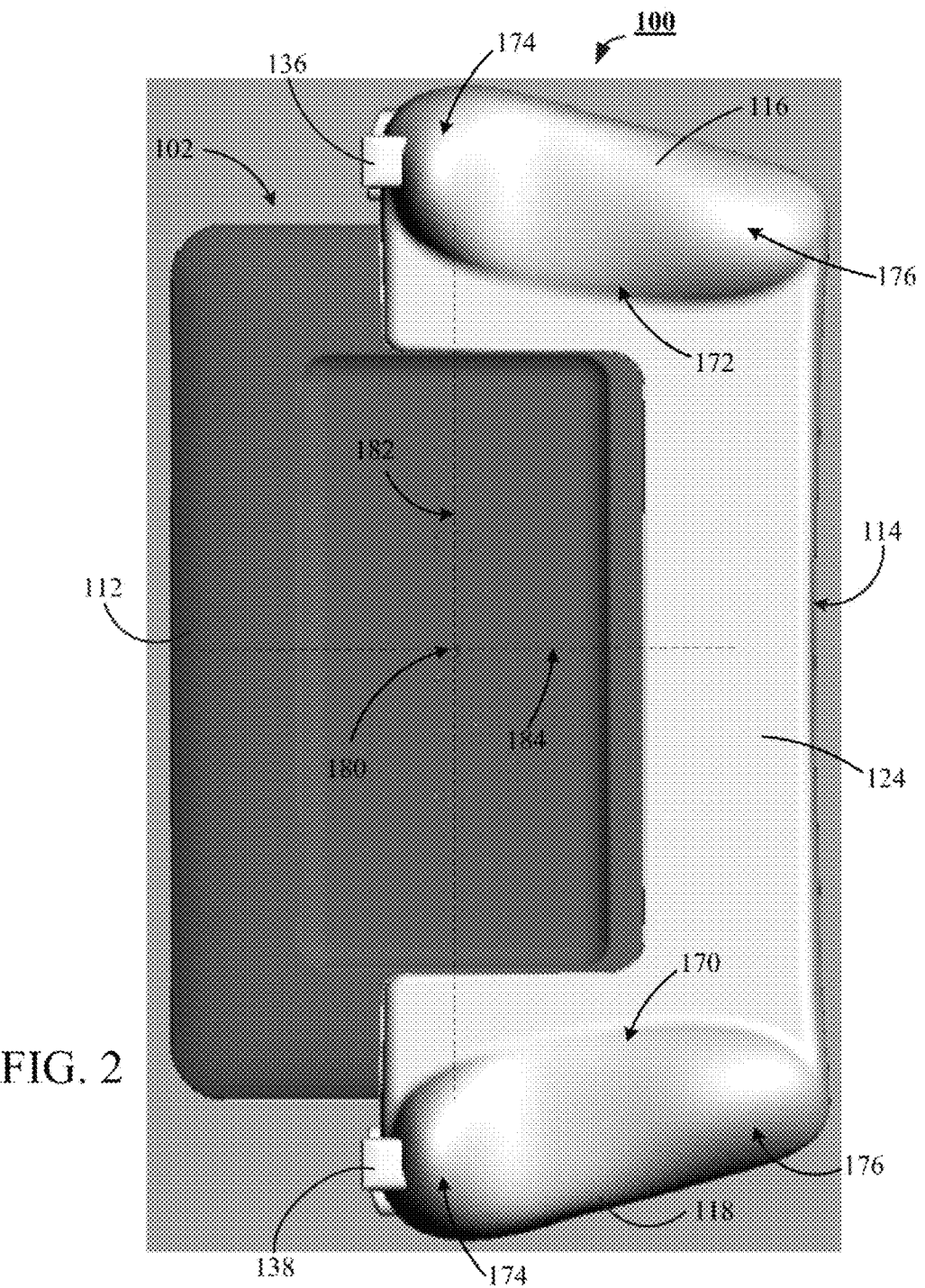
FIG. 2 shows a back plan view of the apparatus of FIG. 1.

FIG. 2 depicts the exemplary game controller 100, mid reveals the back 112 of the tablet computer 102. Further shown by FIG. 2, is the input device 114, which provides a pair of trigger switches 136 and 138, supported by their corresponding side structures 116 and 118 respectively. It is noted by FIGS. 2 and 3 that the side structures 116 and 118 are ergonomically designed for hands of a user through the use of continuous, compound convex finger support surfaces 170 and 172, in conjunction with their respective associated compound, concave finger restraints 174 and 176, to fit comfortably in the hands of users over a wide range of hand sizes from children to large adults. FIG. 2 further shows a midpoint 180, of the back of the tablet computer 102, dashed line 182 passing through the midpoint 180 to more clearly show the upper half distinct from the lower half of the back of the tablet computer 102, and dashed line 184 passing through the midpoint 180 to more clearly show the right half distinctly from the left half of the tablet computer 102. The bridge structure 124 in combination with the pair of side structures 116 and 118 form a three sided structure 128 (of FIG. 5) (also referred to herein as a u-shaped structure 128 of the input device. As can be seen by FIG. 2, the u-shaped structure 128 is formed such that the input device 114 masks less than a majority (not greater than one half) of the back of the tablet computer 102 by assuring that the u-shaped structure is absent structure between the vertical portions of the u-shaped structure 128.

Figure 3:
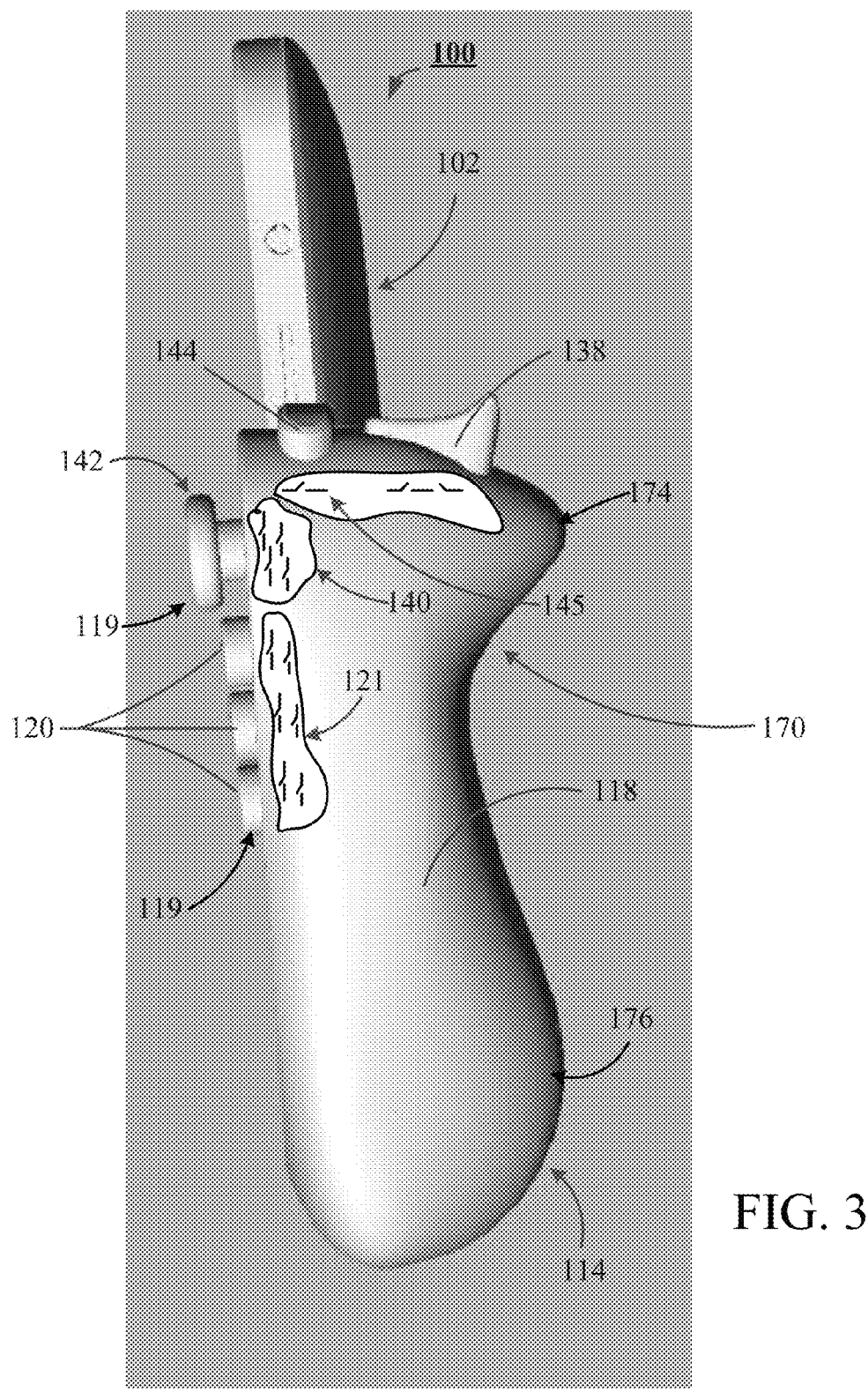
FIG. 3 displays a right side plan view, with partial cutaway, of the apparatus of FIG. 1, constructed in accordance with various embodiments disclosed and claimed herein.

Turning to FIG. 3, shows that a predetermined number of the plurality of switches 140, collaborate with each other to form an input apparatus 142, the input apparatus 142 controls display of virtual objects displayed on the electronic display screen 110 of the tablet computer 102. Preferably, the input apparatus 142 is a joystick 142. FIG. 3 further shows that the input device 114 provides a plurality of buttons 144 and 120 which activate corresponding switches 145 and 121. The main function of the trigger 138, the joystick 142, and the buttons 144 and 120 is to govern the movement/actions of a playable body/object or otherwise influence events in a video game 130 (of FIG. 1) or an alternate computer game.

Figure 4:
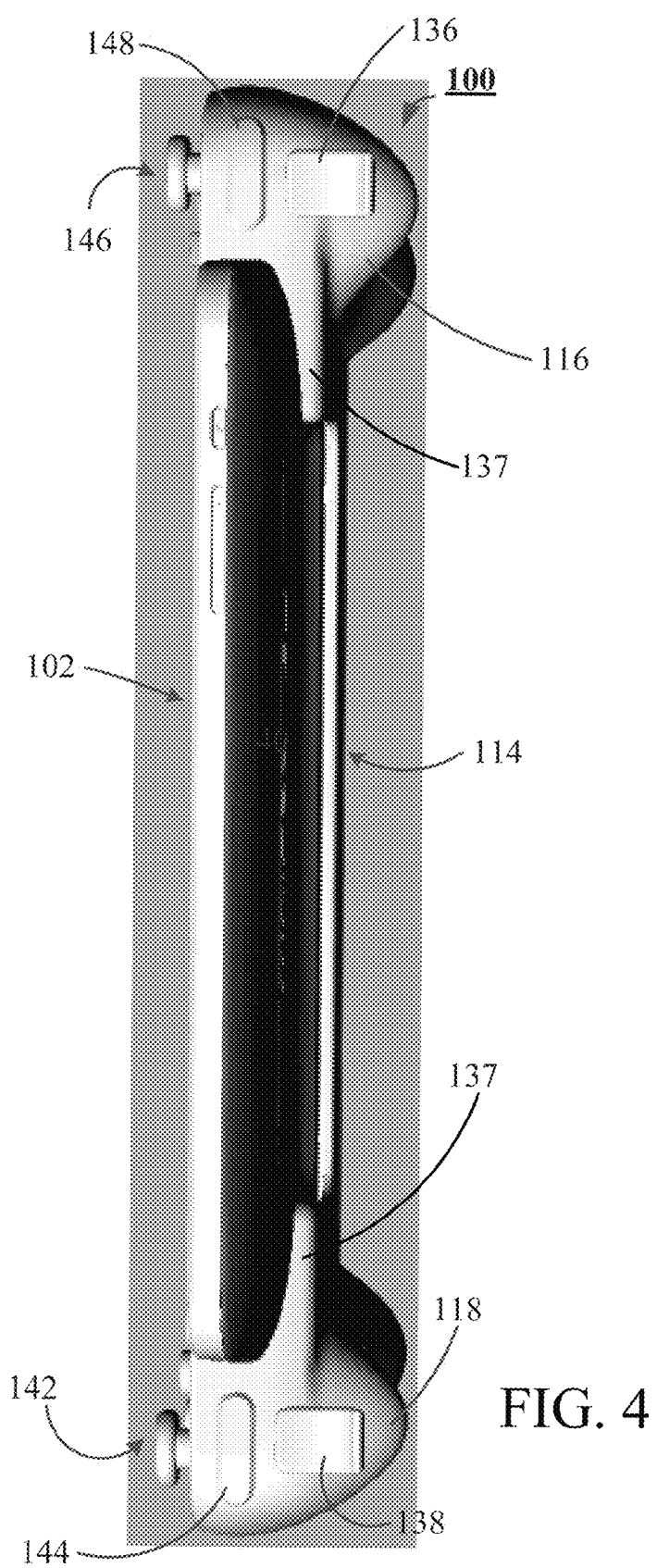
FIG. 4 depicts aright side plan view of the apparatus of FIG. 1, constructed in accordance with various embodiments disclosed and claimed herein.
Figure 5:
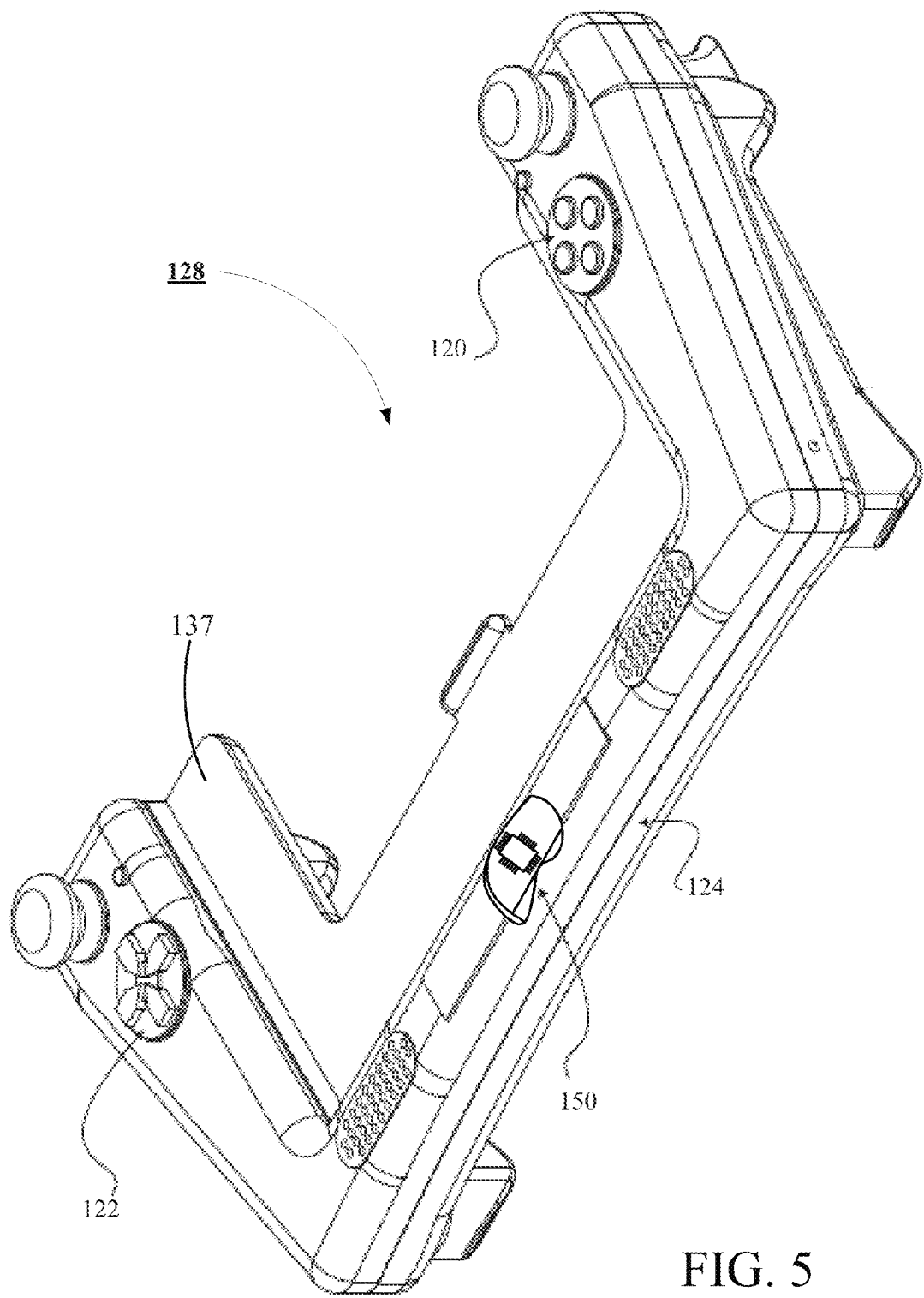
FIG. 5 illustrates a top perspective view of an embodiment of an input device of FIG. 1, constructed in accordance with various embodiments disclosed and claimed herein.

FIG. 4 shows the exemplary game controller 100, further includes a second joystick 146, and a second button 148, which are provided on the side structure 116, adjacent trigger 136, and a support flange 137, in contact adjacency with the back of the tablet computer 102. While FIG. 5 shows the central processing unit (CPU) 150, of the input device 114, and a more revealing view of the support flange 137.

Figure 6:
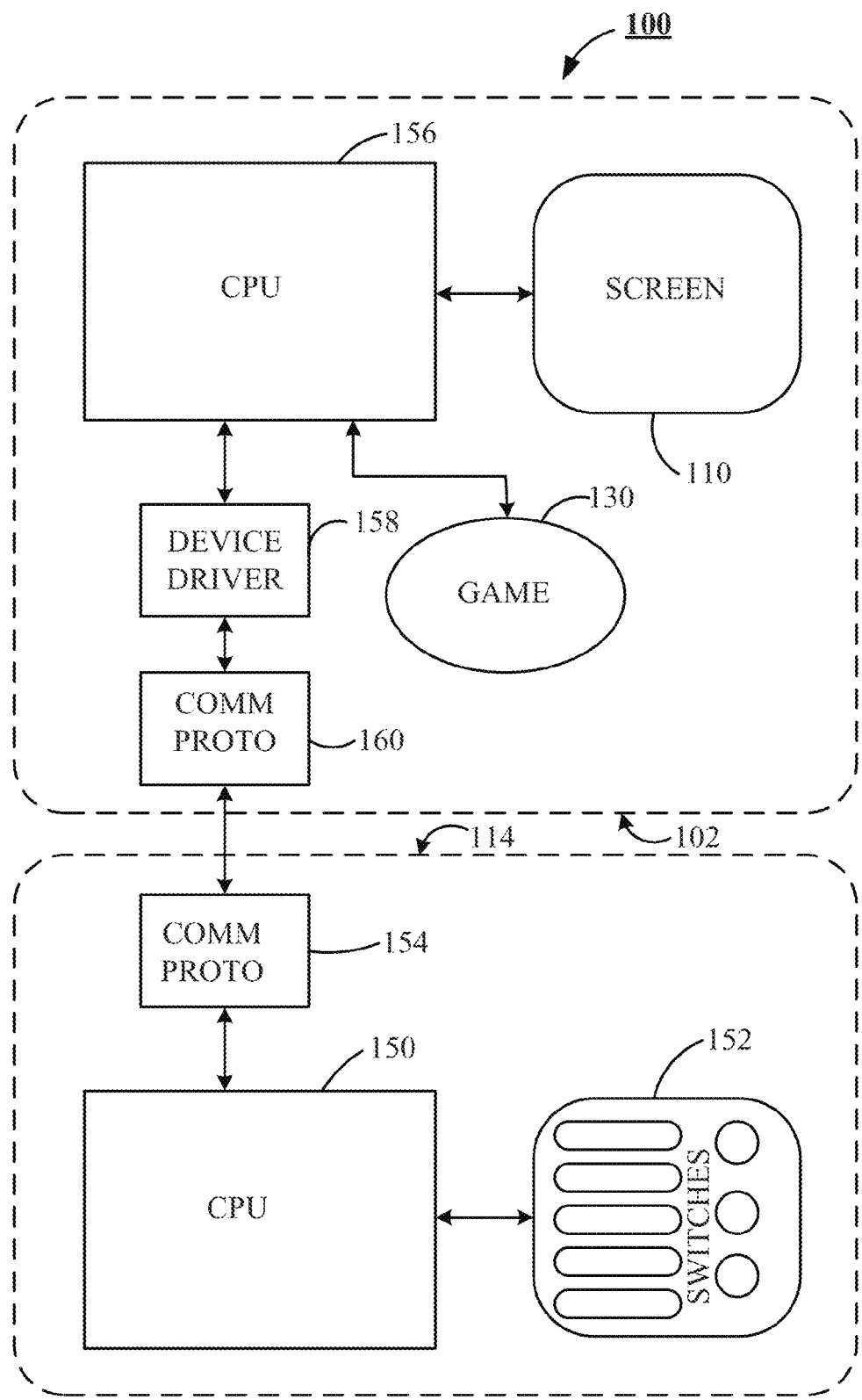
FIG. 6 is a block diagram of an embodiment of the apparatus of FIG. 1.

FIG. 6 shows the input device 114 includes the CPU 150, interacting with the plurality of switches 152, which preferably include at least switches 120, 122, 136, 138, 142, 144, 146, and 148. FIG. 6 further shows the input device 114 further includes a communications protocol 154 providing the communication link between the tablet computer 102, and the input device 114. In a preferred embodiment a Universal Serial Bus (USB) communications protocol is utilized. However, as those skilled in the art will recognize, the communications protocol 154 is not limited to a USB protocol.

FIG. 6 further shows that the tablet computer 102 preferably includes at least a CPU 156, interacting with the electronic display screen 110, the video game 130, a device driver 158, which facilitates the interaction between the tablet computer 102 and the input device 114, and a communications protocol 160 providing the communication link between the tablet computer 102, and the input device 114. In a preferred embodiment a Universal Serial Bus (USB) communications protocol is utilized. However, as those skilled in the art will recognize, the communications protocol 160 is not limited to a USB protocol.

Figure 7:
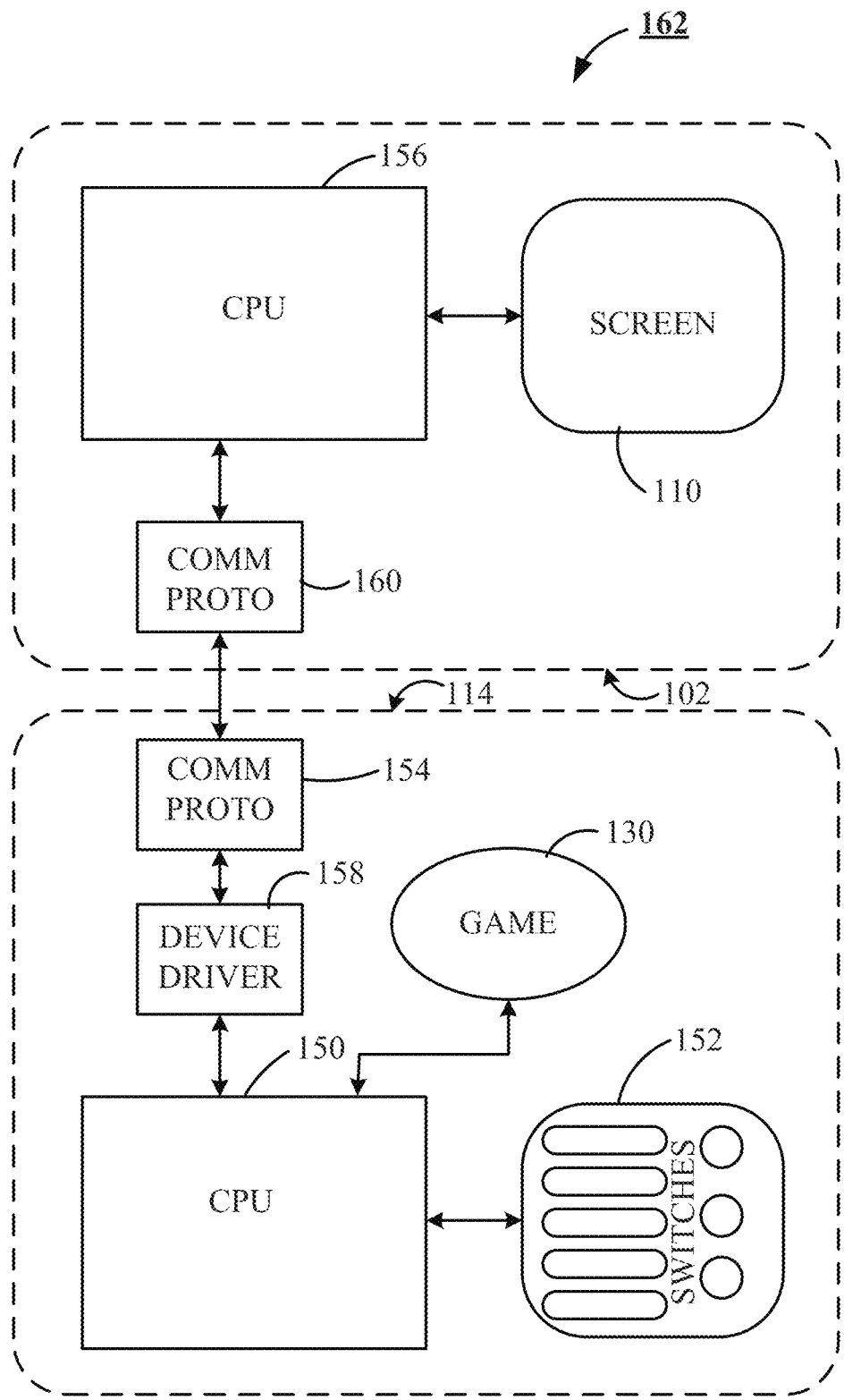
FIG. 7 is a block diagram of an alternate embodiment of the apparatus of FIG. 1.

FIG. 7 shows an alternative embodiment of an exemplary game controller 162, in which the device driver 158 and the video game 130 are located in the input device 114.

It is to be understood that even though numerous characteristics and configurations of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular tablet computer without departing from the spirit and scope of the present invention.

What is claimed is:

1. A device comprising:
a tablet computer, the tablet computer providing a plurality of sides, each of the plurality of sides are disposed between an electronic display screen of the tablet computer and a back of the tablet computer;
an input device in electronic communication with the tablet computer, the input device providing side structures, the side structures adjacent to and confining the tablet computer on at least two opposing sides of the plurality of sides and not more than three sides of the tablet computer, the input device providing a plurality of input switches, wherein said input switches are adjacent each of the at least two opposing sides of the plurality of sides of the tablet computer, and in which the input device masks less than a majority of the back of the tablet computer, and further in which the input device further comprises a bridge structure disposed between the side structures and adjacent a third side of the plurality of sides of the tablet computer, the bridge structure in combination with the side structures form not more than a three sided open U-shaped structure with an absence of structure between the vertical portions of the U-shaped structure in which the tablet computer nests, such that the tablet computer is confined by the three sided structure, and the three sided structure mitigates inadvertent removal of the tablet computer from the three sided structure when the tablet computer is fully nested within the three sided structure; and
a device driver communicating with each the input, device and the tablet computer.

2. The device of claim 1, in which a predetermined number of the plurality of switches collaborate with each other to form an input apparatus, the input apparatus controls display of virtual objects displayed on the electronic display screen of the tablet computer.

3. The device of claim 1, in which the device driver resides on the tablet computer.

4. The device of claim 1, in which the device driver resides on the input device.

5. The device of claim 1, in which the input device communicates with the tablet computer by way of a communications protocol.

6. The device of claim 1, in which a select switch, of the plurality of switches, provides a housing, wherein upon a manual intervention of the housing of the selected switch, the switch produces a predetermined signal provided to the tablet computer.

7. The device of claim 1, further comprising a video game, the video game provides a virtual object displayed by the electronic display screen, the virtual object responsive to input from the input device.

8. The device of claim 1, further comprising a computer game, the computer game provides an object displayed by the electronic display screen, the object responsive to input from the input device.

9. The device of claim 1, in which the each side structure of the input device is configured with compound, concave finger support structures in conjunction with their respective compound, convex finger restraints to fit comfortably in a hand of a user.

10. An apparatus comprising:
a tablet computer, the tablet computer providing a plurality of sides, each of the plurality of sides are disposed between an electronic display screen of the tablet computer and a back of the tablet computer;
an electronic game communicating with the tablet computer, the electronic game providing a virtual object displayed on the electronic display screen of the tablet computer; and
means for controlling a movement of the virtual object displayed on the electronic display screen of the tablet computer.

11. The apparatus of claim 10, in which the means for controlling the movement of the object displayed on the electronic display screen is provided by an input device, the input device comprises:
a pair of side structures, one of the pair of side structures is adjacent to and confines the tablet computer on a first side of the plurality of sides of the tablet computer, the second side structure of the pair of side structures is adjacent to and confines the tablet computer on a second side of the plurality of sides of the tablet computer, wherein the first and second sides of the plurality of sides of the tablet computer are opposing sides of the plurality of sides of the tablet computer;
a plurality of input switches, wherein said input switches are adjacent each of the at least two opposing sides of the plurality of sides of the tablet computer; and
a bridge structure disposed between the pair of side structures and adjacent a third side of the plurality of sides of the tablet computer, the bridge structure in combination with the pair of side structures from a three sided open U-shaped structure with an absence of structure between the vertical portions of the U-shaped structure in which the tablet computer nests such that the tablet computer is confined by the not more than three sided structure and its associated flange, the not more than three sided structure and its associated flange mitigates inadvertent removal of the tablet computer from the not more than three sided structure and its associated flange when the tablet computer is fully nested within the not more than three sided structure and its associated flange, and in which the input device masks less than a majority of the back of the tablet computer, a three sided open U-shaped structure with an absence of structure between the vertical portions of the U-shaped structure.

12. The apparatus of claim 11, further comprises:
a first input/output connector provided by the tablet computer;
a second input/output connector provided by the input device; and
a communications protocol, the communications protocol provides structured communication between the tablet computer and the input device when the first and second input/output connectors are connected together.

13. The apparatus of claim 12, in which the communications protocol is a universal serial bus, and the first and second input/output connectors are universal serial bus connectors.

14. The apparatus of claim 13, in which the three sided structure forms a u-shaped structure.

15. The apparatus of claim 14, in which a predetermined number of the plurality of switches collaborate with each other to form an input device, the input device controls movement of the object of the video game displayed on the electronic display screen of the tablet computer.

16. The apparatus of claim 15, in which the input device is selected from a group consisting of a trigger, a joystick, and a button.

17. The apparatus of claim 16, further comprises a device driver communicating with each the input device and the tablet computer.

18. The apparatus of claim 17, in which the device driver and the video game are located in the input device.

* * * * *